United States Patent [19]
Kurby et al.

[11] Patent Number: 5,347,542
[45] Date of Patent: Sep. 13, 1994

[54] DEMODULATION SELECTION FOR A COMMUNICATION SIGNAL

[75] Inventors: Christopher N. Kurby, Elmhurst; Donald R. Beyer, Bartlett; Anne P. Davies-Walsh, Lindenhurst; Kevin L. Fluharty, Elgin; Matthew R. Miller, Schaumburg, all of Ill.

[73] Assignee: Motorola, Inc., Schaumburg, Ill.

[21] Appl. No.: 723,288

[22] Filed: Jun. 28, 1991

[51] Int. Cl.⁵ ............................................. H04L 25/49
[52] U.S. Cl. ....................................... 375/17; 455/143
[58] Field of Search ................. 375/17, 18, 19, 20, 375/75, 76, 94; 455/142, 143, 102, 101, 144

[56] References Cited

U.S. PATENT DOCUMENTS

| | | | |
|---|---|---|---|
| 3,566,037 | 2/1971 | Fichtner | 455/142 |
| 3,665,507 | 5/1972 | Peil | 455/142 |
| 3,688,197 | 8/1972 | Kahn | 455/142 |
| 3,995,225 | 11/1976 | Horn | 375/94 |
| 4,151,475 | 4/1979 | von der Neyen | 375/102 |
| 4,176,321 | 11/1979 | Horn | 375/28 |
| 4,197,502 | 4/1980 | Sumner et al. | 375/75 |
| 4,660,192 | 4/1987 | Pomatto | 455/102 |
| 4,704,736 | 11/1987 | Kasser | 455/213 |
| 4,757,519 | 7/1988 | Collison et al. | 375/17 |
| 4,821,292 | 4/1989 | Childress | 375/76 |
| 4,841,571 | 6/1989 | Kage | 455/102 |
| 4,967,407 | 10/1990 | Lynk et al. | 370/50 |
| 5,038,351 | 8/1991 | Sakai et al. | 375/20 |
| 5,134,719 | 7/1992 | Mankovitz | 455/154.1 |

Primary Examiner—Stephen Chin
Assistant Examiner—Young Tse
Attorney, Agent, or Firm—Susan L. Lukasik; Steven G. Parmelee; Wayne J. Egan

[57] ABSTRACT

In a system where 2-level modulation and 4-level modulation of communication signals exist, an apparatus (107) demodulates either modulation scheme by demodulating (301) a received signal under the presumption that it is a 4-level signal, and if the received signal is detected (309) to be a 2-level signal, the signal is then demodulated (319) as a 2-level signal.

24 Claims, 3 Drawing Sheets

DEMODULATION SELECTION FOR A COMMUNICATION SIGNAL

FIELD OF THE INVENTION

This invention relates to demodulation of radio frequency signals, including but not limited to demodulation of signals having differing modulation schemes.

BACKGROUND OF THE INVENTION

Various RF (radio frequency) modulation schemes are known. 2-level FM (frequency modulation) and 4-level FM are commonly used. 2-level FM ("2-level") has good sensitivity performance at the receiver, but poor multipath distortion performance. 4-level FM ("4-level"), while having poorer sensitivity performance than 2-level, has better multipath distortion performance for simulcast systems because 4-level uses a clock at half the rate of the 2-level clock and therefore can tolerate more inter-symbol interference.

The most common communication systems are not simulcast systems. Hence most systems are 2-level systems in order to benefit from better sensitivity performance. However, simulcast system use is increasing as is the size of simulcast systems.

If a large user group, having 2-level communication units, such as radios, base stations and the like, in its system, decided to switch to a simulcast system to attain the benefits of a simulcast system, poor performance would be realized because of distortion. The radios are unable to modulate or demodulate 4-level transmissions. To replace all the radios with 4-level radios would be expensive, and 4-level still suffers from poor receiver sensitivity.

A possible solution is to have a system which combines 2-level and 4-level in order to minimize disadvantages of each. Using 2-level modulation inbound to the infrastructure as well as in talk-around and 4-level outbound from the infrastructure (simulcast transmissions) would minimize distortion while maximizing sensitivity. If a retrofit of the modulation/demodulation circuits in existing radios were done to minimize costs, a system with 2-level and 4-level would be difficult because the additional 4-level circuitry and the 2-level to 4-level interface circuitry would take up at least twice as much space as the previous 2-level circuitry, and it is unlikely that the circuitry would fit in the radio.

Furthermore, a big difference between 4-level and 2-level systems is repetitive pattern recognition. Many 2-level systems use a binary 10101010 pattern for various signal functions, such as end-of-message (EOM). This 10101010 pattern has good dc signal balance characteristics for 2-level modulation. However, if this same 10101010 pattern were modulated into a 4-level signal, the result would be a flat signal, which has no dc signal balance. Hence, a different pattern must be chosen for 4-level EOM detection. The problem with changing this pattern is that existing voice and data processing circuits which use this EOM signal are not capable of detecting a new pattern, and making new circuits for this detector is a highly costly endeavor.

Accordingly, what is needed is an apparatus which can inexpensively convert a normal 2-level radio into a radio capable of receiving both 2-level and 4-level signals while providing pattern recognition without changing existing voice and data circuits.

DESCRIPTION OF A PREFERRED EMBODIMENT

The following describes an apparatus that enables a radio to receive both 2-level and 4-level modulated signals in one current-art communication unit without having to change existing voice and data circuits. The radio's previous demodulation circuitry is replaced by circuitry that demodulates a signal under the blind assumption that it is a 4-level signal, but that proceeds to demodulate the signal as a 2-level signal when a 2-level signal is detected. This circuitry also provides a proper EOM pattern to voice and data circuits within the radio regardless of whether the received signal is a 2-level or a 4-level signal.

Figure 1:
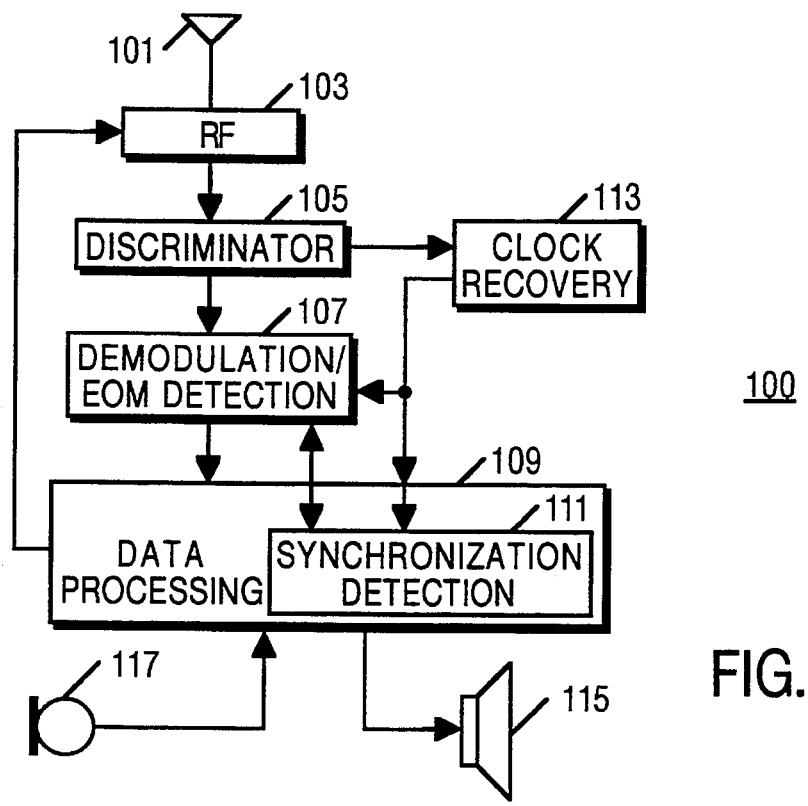
FIG. 1 is a block diagram of a communication unit in accordance with the invention.

A block diagram of a communication unit appears in FIG. 1 as generally represented by the reference numeral 100. The receiver portion of the portable communication unit 100 uses an antenna 101 to receive a transmitted signal and the receive section of an RF (radio frequency) section 103 to demodulate the RF portion of the signal, as input to a discriminator 105. The discriminator 105 determines amplitude variations from the frequency variations of the signal received from the RF section 103, as is known in the art. The discriminator 105 couples to a demodulation/EOM detection block 107, which performs baseband demodulation of the discriminated signal and detects presence of EOM in the signal to provide recovered data to the data processing block 109. (See FIG. 2 for more information about the demodulation/EOM detection block 107). The recovered data is provided to a data processing block 109 that provides, during the receive function, digital-to-analog processing, voice decoding, decryption, and so forth. The data processing block 109 also includes a synchronization detection block 111 that provides detection of synchronization of the transmitted signal to the received signal, as is known in the art. The reconstructed analog voice information from the data processing block 109 is output to a speaker 115 that renders the information audible, as is well known in the art.

The discriminator 105 output is also fed into a clock recovery circuit 113, which recovers and synchronizes an appropriate clock signal for the received signal, as is known in the art. The recovered clock signal is output to the demodulation/EOM detection block 107 and data processing block 109. A 12 kHz clock is provided for 2-level circuitry and data processing, and a 6 kHz clock is provided for 4-level circuitry.

The transmitter part of the communication unit 100 includes generally a microphone 117 for receiving an audible voice message to be transmitted. The transduced output of the microphone 117 comprises an analog signal representing the voice input, and passes through appropriate data processing circuitry 109, such as analog-to-digital processing, voice encoding, encryption, and so forth.

The data processing circuitry 109 provides its output to the RF section 103, which uses the provided data to modulate an appropriate carrier signal, which carrier signal is then radiated from the antenna 101, all as well known in the art. Because separate modulation and demodulation circuitry is provided, it is possible to transmit and receive simultaneously using any combination of 2-level/4-level combination, such as transmitting in 2-level while receiving a 4-level signal.

Figure 2:
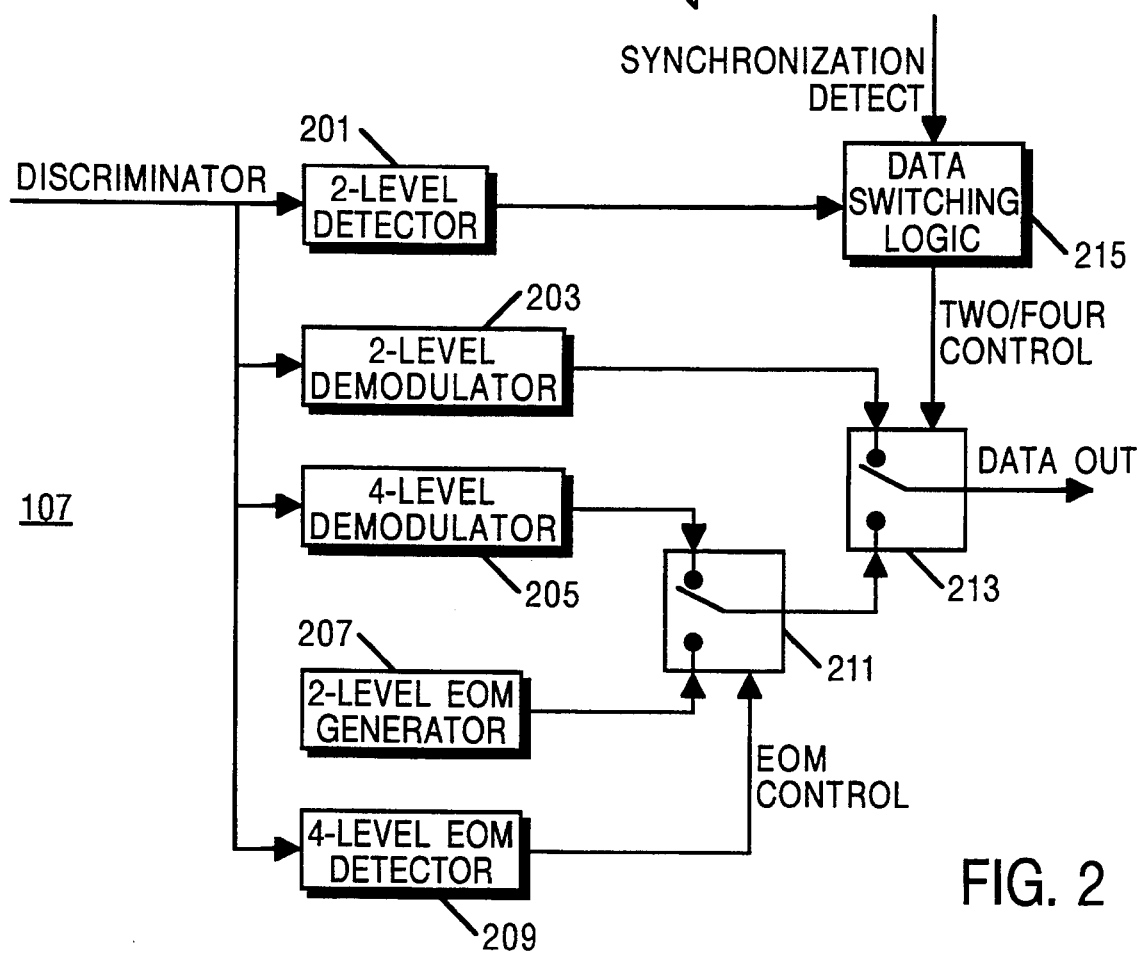
FIG. 2 is a block diagram of demodulation selection circuitry and EOM detection circuitry in accordance with the invention.
Figure 3:
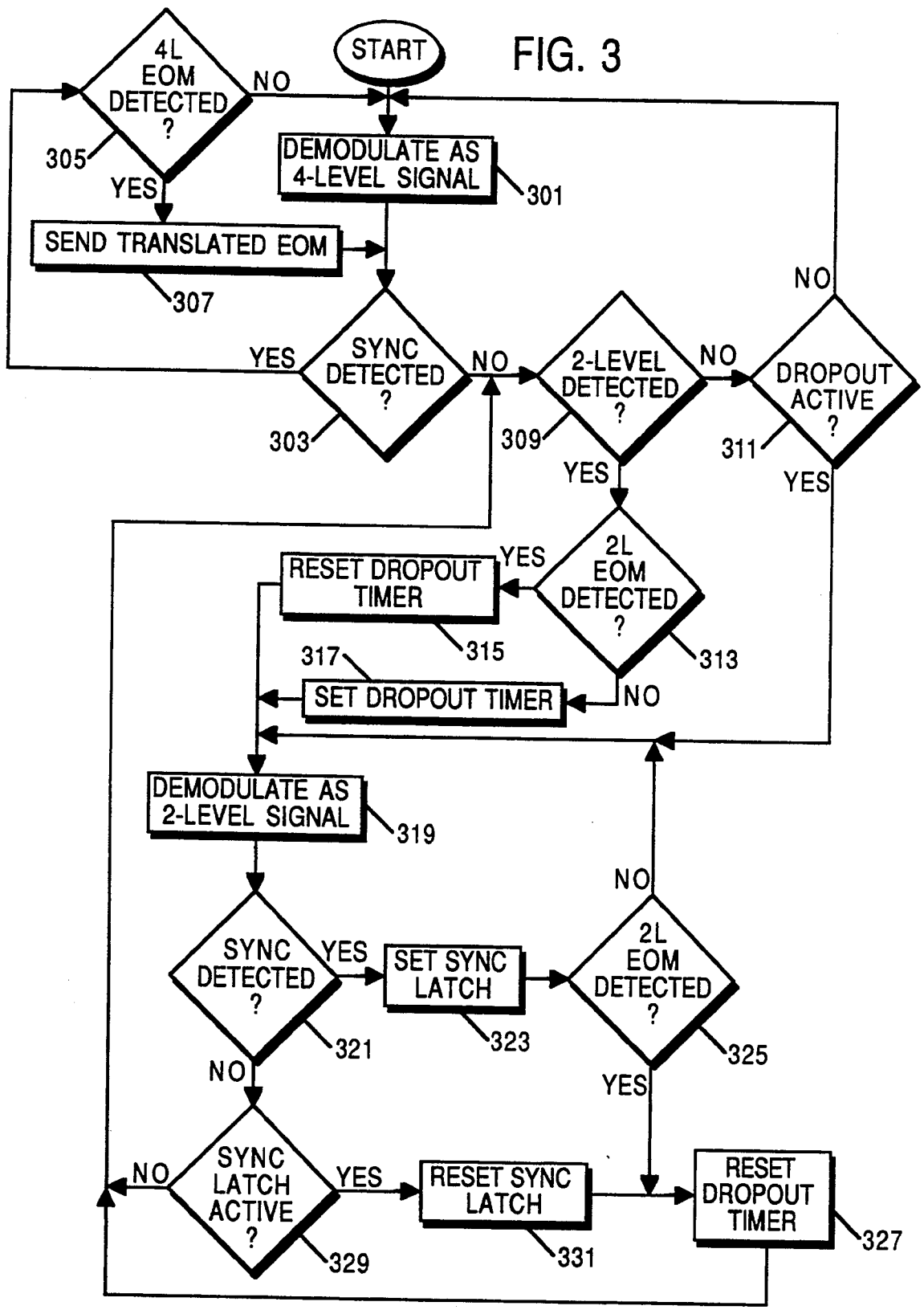
FIG. 3 is a flowchart showing incorporation of demodulation selection and EOM detection into a communication unit in accordance with the invention.
Figure 4:
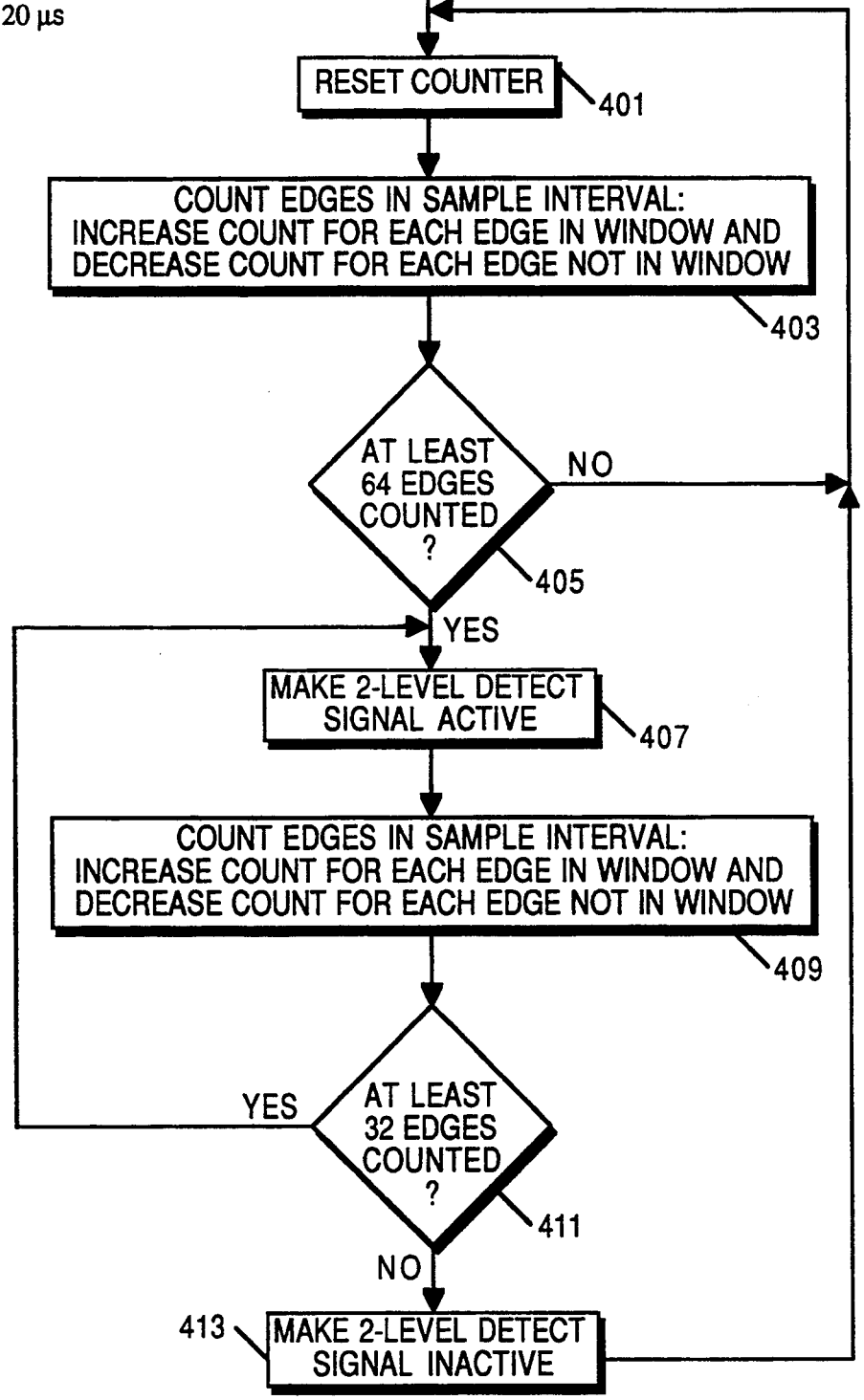
FIG. 4 is a flowchart showing 2-level modulation detection in accordance with the invention.

Referring now to FIG. 2, the output from the discriminator 105 is input to a 2-level (modulation) detector 201, the function of which is described in FIG. 4. The output of the 2-level detector 201 is input to a data switching logic block 215, which also receives a synchronization detect signal from the synchronization detection block 111 and decides if a 2-level or 4-level signal is received, as shown in the flowchart of FIG. 3. The recovered clock signal (not shown in FIG. 2) from the clock recovery block 113 is used by the 2-level (modulation) detector 201 and data switching logic block 215. Another function of the 2-level detector 201 is 2-level EOM detection, used to detect a 2-level 01010101 pattern, as is known in the art.

The discriminator 105 output is also input to a 2-level demodulator 203, which aligns a received 12 kbps 2-level signal with the recovered clock signal (not shown in FIG. 2) from the clock recovery block 113 and outputs the result to a switch 213. The discriminator 105 output is also input to a 4-level demodulator 205, which reverse Gray codes a received 6 kilo-symbol per second 4-level signal to a binary digital signal comprised of 2 bits per symbol aligned with the 12 kHz recovered clock signal (not shown in FIG. 2) from the clock recovery block 113 and outputs the result to another switch 211 that provides decoded 4-level data to the switch 213. An example of a 4-level demodulator is found in U.S. patent application Ser. No. 07/620,601, titled "Automatic Threshold Control for Multi-Level Signals," filed on Nov. 29, 1990 on behalf of David G. Wiatrowski et al., with the same assignee as the present invention.

In the preferred embodiment, an EOM signal of repetitive binary 00100010 is Gray coded to a 4-level signal to provide a recognizable pattern with dc signal balance. This pattern is transmitted at the end of a 4-level message. A 4-level EOM detector 209 can detect the Gray-coded 00100010 pattern from the discriminator 105 output. When the 4-level EOM detector 209 detects 4-level EOM, it asserts an EOM control signal to the switch 211, which causes the output from a 2-level EOM generator 207 to be the output of the switch 211. The 2-level EOM generator generates a binary 10101010 pattern which is recognizable by the voice and data circuits in the data processing circuitry 109. Thus, a 4-level EOM signal with good dc balance is transmitted and "translated" into a 2-level EOM signal that is expected by the voice and data circuitry.

The output of the data switching logic 215 is a two-/four control signal which controls whether the data provided to the data processing block 109 is recovered from 2-level modulation, as provided by the 2-level demodulator 203, or 4-level modulation, as provided by switch 211.

The communication unit performs the steps in the flowchart of FIG. 3 within the hardware in the demodulation/EOM detection block 107. At step 301, the discriminator signal is demodulated as a 4-level signal by presuming, without confirming, that the received signal has been modulated by a 4-level modulation scheme. If at step 303 sync (synchronization) is detected, the synchronization detect signal as provided by the synchronization detection block 111, the process continues with step 305. If 4-level ("4L") EOM is not detected at step 305, as determined by the 4-level EOM detector 209, the process continues with step 301. If 4-level EOM is detected at step 305, translated EOM, as generated by the 2-level EOM generator 207, is output to the data processing block (instead of the demodulated 4-level EOM signal), and the process continues with step 303.

If at step 303 sync is not detected, the process continues with step 309. If at step 309 2-level modulation is detected by the 2-level detector 201, the process continues with step 313, and if 2-level modulation is not detected, the process continues with step 311.

In the preferred embodiment, a dropout signal, output by a dropout timer, is used to allow the communication unit to remain unsquelched for a short time during fading conditions without having to reset the unit. The dropout timer resides in the data switching logic 215 of FIG. 2. If dropout is not active at step 311, the process continues with step 301. If dropout is active at step 311, the process continues with step 319. If at step 313 EOM is detected, the dropout timer is reset at step 315. If at step 313 EOM is not detected, the dropout timer is set at step 317. The discriminator signal is demodulated as a 2-level signal at step 319.

If sync is detected (as in step 303) at step 321, the sync latch in the data switching logic 215 is set at step 323. If at step 325, 2-level ("2L") EOM is not detected, the process continues with step 319, and if 2-level EOM is detected, the process continues with step 327. If sync is not detected at step 321, the process continues with step 329. If at step 329 the sync latch is not active, the process continues with step 309. If at step 329 the sync latch is active, the sync latch is reset at step 331. The dropout timer is reset at step 327, and the process continues with step 309.

Use of the synchronization detect signal from the synchronization detection block 111 is not a necessary step in this embodiment, since the signal is derived from demodulated data, but improves the reliability of the presumption that a 4-level signal was sent in a fairly rapid manner. Similarly, use of the dropout timer in the data switching logic is not a necessary step in this embodiment, but enhances the ability to maintain system integrity during signal fades.

Figure 5:
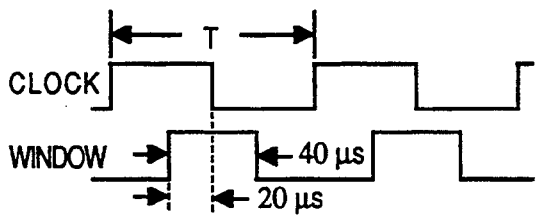
FIG. 5 is a timing diagram showing 2-level modulation detection information in accordance with the invention.

2-level modulation detection, as performed in the 2-level detector 201 of FIG. 2, is shown in the flowchart of FIG. 4. A counter is reset at step 401. At step 403, the edges are counted in a sample interval, which is 256 periods of a 12 kHz clock in the preferred embodiment. The (edge) count is increased for each edge which appears in the window, as shown in FIG. 5, and the (edge) count is decreased for each edge which does not appear in the window. If at step 405 there are not at least 64 edges counted in step 403, the process continues with step 401. If at step 405 there are at least 64 edges counted in step 403, then the output, a 2-level detect signal, of the 2-level detector 201 is made active, signifying a 2-level detect.

At step 409, after resetting the counter (not shown), the edges are counted in the next sample interval. As in step 403, the (edge) count is increased for each edge which appears in the window, as shown in FIG. 5, and the (edge) count is decreased for each edge which does not appear in the window. If at step 411 there are not at least 32 edges counted in step 409, the 2-level detect signal that is output by the 2-level detector 201 is made inactive, signifying that 2-level in no longer detected. If at step 411 there are at least 32 edges counted in step 403, the process continues with step 407.

A timing diagram showing 2-level modulation detection information is shown in FIG. 5. The 12 kHz clock signal is shown with period T. A window signal is shown below the clock signal, where a 40 μs window is centered about the falling edge of the clock signal. Edges are determined to be in the window when the window signal indicates a logical "high," and edges are determined to not be in the window when the window signal indicates a logical "low." The values chosen for the width of the "high" portion of the window signal were optimized to allow the communication system to operate under bit error rates around 5%.

The apparatus as described receives both 2-level and 4-level modulated signals in one communication unit without having to change existing voice and data circuits and also provides the proper EOM pattern to voice and data circuits whether the received signal is a 2-level or a 4-level signal. Circuitry is also provided such that simultaneous transmission and reception of 2-level and/or 4-level modulation/demodulation can occur, even if the received demodulation scheme does not match the transmitted modulation scheme.

The preferred embodiment described detecting when a received signal has been modulated by a first (4-level) modulation scheme and demodulating the received signal according to the first (4-level) modulation scheme, i.e., by using a first (4-level) demodulation scheme, and when unable to detect that the received signal has been modulated by the first (4-level) modulation scheme, presuming that the received signal has been modulated by a second (2-level) modulation scheme, and attempting to demodulate the received signal according to the second (2-level) modulation scheme, i.e., by using a second (2-level) demodulation scheme. Without loss of function, it is without the spirit of the invention to detect when a received signal has been modulated by the second (2-level) modulation scheme and demodulating the received signal according to the second (2-level) modulation scheme, i.e., by using the second (2-level) demodulation scheme, and when unable to detect that the received signal has been modulated by the second (2-level) modulation scheme, presuming that the received signal has been modulated by the first (4-level) modulation scheme, and attempting to demodulate the received signal according to the second first (4-level) modulation scheme, i.e., by using the second first (4-level) demodulation scheme.

What is claimed is:

1. A method of demodulating a received signal that was modulated by one of a first modulation scheme and a second modulation scheme, comprising the steps of:

outputting a signal formed by attempting to demodulate the received signal using a first demodulation scheme;

detecting when the received signal was modulated by the second modulation scheme; and outputting, responsive to said detecting step, a signal formed by demodulating the received signal using a second demodulation scheme.

2. The method of claim 1, wherein said second demodulation scheme is a 2-level demodulation scheme and said first demodulation scheme is a 4-level demodulation scheme.

3. The method of claim 1, further comprising the step of transmitting a signal modulated according to one of said first modulation scheme and said second modulation scheme, regardless of whether the received signal was modulated by said first modulation scheme or said second modulation scheme.

4. The method of claim 1, wherein the received signal has an end-of-message signal, and further comprising the step of detecting the end-of-message signal of the received signal.

5. The method of claim 4, further comprising the step of returning, responsive to said step of detecting the end-of-message signal of the received signal, to demodulating according to said first demodulation scheme.

6. The method of claim 1, further comprising the steps of:

modulating the received signal as demodulated according to one of said first modulation scheme and said second modulation scheme, regardless of whether the received signal was modulated by said first modulation scheme or said second modulation scheme, producing a second modulated signal; and providing, responsive to said step of modulating, said second modulated signal.

7. The method of claim 6, wherein said second demodulation scheme is a 4-level demodulation scheme and said first demodulation scheme is a 2-level demodulation scheme.

8. The method of claim 6, wherein said second demodulation scheme is a 2-level demodulation scheme and said first demodulation scheme is a 4-level demodulation scheme.

9. A method of demodulating a received signal that was modulated by one of a first modulation scheme and a second modulation scheme in a system that transmits a first end-of-message signal and a second end-of-message signal, comprising the steps of:

outputting a signal formed by attempting to demodulate the received signal using a first demodulation scheme;

detecting when the received signal was modulated by the second modulation scheme;

outputting, responsive to said detecting step, a signal formed by demodulating the received signal using a second demodulation scheme;

detecting one of the first end-of-message signal and the second end-of-message signal; and providing, responsive to said step of detecting one of the first end-of-message signal and the second end-of-message signal, as an output signal a common end-of-message signal.

10. The method of claim 9, wherein said second demodulation scheme is a 2-level demodulation scheme and said first demodulation scheme is a 4-level demodulation scheme.

11. The method of claim 9, further comprising the step of transmitting a signal modulated according to one of said first modulation scheme and said second modulation scheme, regardless of whether the received signal was modulated by said first modulation scheme or said second modulation scheme.

12. The method of claim 9, wherein said common end-of-message signal is comprised of said second end-of-message signal.

13. A communication unit capable of demodulating a received signal that was modulated by one of a first modulation scheme and a second modulation scheme, the communication unit comprising:
    means for outputting a signal formed by attempting to demodulate the received signal using a first demodulation scheme;
    means for detecting when the received signal was modulated by the second modulation scheme; and
    means, operative coupled to said detecting means, for outputting a signal formed by demodulating the received signal using a second demodulation scheme.

14. The communication unit of claim 13, wherein said second demodulation scheme is a 2-level demodulation scheme and said first demodulation scheme is a 4-level demodulation scheme.

15. The communication unit of claim 13, further comprising means for transmitting a signal modulated according to one of said first modulation scheme and said second modulation scheme, regardless of whether the received signal was modulated by said first modulation scheme or said second modulation scheme.

16. The communication unit of claim 13, wherein the received signal has an end-of-message signal, and further comprising means for detecting the end-of-message signal of the received signal.

17. The communication unit of claim 16, further comprising means for returning, coupled to said means for detecting the end-of-message signal of the received signal, to demodulating according to said first demodulation scheme.

18. The communication unit of claim 13, further comprising:
    means for modulating the received signal as demodulated according to one of said first modulation scheme and said second modulation scheme, regardless of whether the received signal was modulated by said first modulation scheme or said second modulation scheme, producing a second modulated signal; and
    means for providing, coupled to said means for modulating, said second modulated signal.

19. The communication unit of claim 18, wherein said second demodulation scheme is a 4-level demodulation scheme and said first demodulation scheme is a 2-level demodulation scheme.

20. The communication unit of claim 18, wherein said second demodulation scheme is a 2-level demodulation scheme and said first demodulation scheme is a 4-level demodulation scheme.

21. A communication unit capable of demodulating a received signal that was modulated by one of a first modulation scheme and a second modulation scheme in a system that transmits a first end-of-message signal and a second end-of-message signal, the communication unit comprising:
    means for outputting a signal formed by attempting to demodulate the received signal using a first demodulation scheme;
    means for detecting when the received signal as modulated by the second modulation scheme;
    means, operatively coupled to said detecting means, for outputting a signal formed by demodulating the received signal using a second demodulation scheme;
    means for detecting one of the first end-of-message signal and the second end-of-message signal; and
    means, operatively coupled to said means for detecting one of the first end-of-message signal and the second end-of-message signal, for providing as an output signal a common end-of-message signal.

22. The communication unit of claim 21, wherein said second demodulation scheme is a 2-level demodulation scheme and said first demodulation scheme is a 4-level demodulation scheme.

23. The communication unit of claim 21, further comprising means for transmitting a signal modulated according to one of said first modulation scheme and said second modulation scheme, regardless of whether the received signal was modulated by said first modulation scheme or said second modulation scheme.

24. The communication unit of claim 21, wherein said common end-of-message signal is comprised of said second end-of-message signal.

* * * * *

UNITED STATES PATENT AND TRADEMARK OFFICE
CERTIFICATE OF CORRECTION

PATENT NO. : 5,347,542

DATED : September 13, 1994

INVENTOR(S) : Christopher N. Kurby et al.

It is certified that error appears in the above-identified patent and that said Letters Patent is hereby corrected as shown below:

In Claim 13, Col. 7, line 13, "operative" should be --operatively--.

In Claim 21, Col. 8, line 20, the word "as" should be --was--.

Signed and Sealed this

Seventeenth Day of January, 1995

Attest:

BRUCE LEHMAN

*Attesting Officer*    *Commissioner of Patents and Trademarks*